(12) United States Patent
Kim

(10) Patent No.: US 9,846,266 B2
(45) Date of Patent: Dec. 19, 2017

(54) LIQUID CRYSTALLINE POLYMER FILM WITH DIFFRACTIVE OPTICAL NOISE REMOVED AND METHOD OF MANUFACTURING THE SAME

(71) Applicant: KYUNGPOOK NATIONAL UNIVERSITY INDUSTRY-ACADEMIC COOPERATION FOUNDATION, Daegu (KR)

(72) Inventor: Hak-Rin Kim, Daegu (KR)

(73) Assignee: KYUNGPOOK NATIONAL UNIVERSITY INDUSTRY-ACADEMIC COOPERATION FOUNDATION, Daegu (KR)

( * ) Notice: Subject to any disclaimer, the term of this patent is extended or adjusted under 35 U.S.C. 154(b) by 0 days.

(21) Appl. No.: 14/914,911

(22) PCT Filed: Nov. 4, 2014

(86) PCT No.: PCT/KR2014/010521
§ 371 (c)(1),
(2) Date: Feb. 26, 2016

(87) PCT Pub. No.: WO2015/080390
PCT Pub. Date: Jun. 4, 2015

(65) Prior Publication Data
US 2016/0306085 A1    Oct. 20, 2016

(30) Foreign Application Priority Data
Nov. 29, 2013   (KR) .................. 10-2013-0147838

(51) Int. Cl.
| | | |
|---|---|---|
| G02F 1/1333 | (2006.01) | |
| G02B 5/30 | (2006.01) | |
| B29D 11/00 | (2006.01) | |
| G02F 1/1337 | (2006.01) | |

(52) U.S. Cl.
CPC ...... *G02B 5/3016* (2013.01); *B29D 11/00644* (2013.01); *B29D 11/00788* (2013.01);
(Continued)

(58) Field of Classification Search
CPC ............ G02B 5/3016; B29D 11/00644; B29D 11/00788; G02F 1/133788; G02F 1/133711; G02F 2001/133776; G02F 2001/133715
(Continued)

(56) References Cited

U.S. PATENT DOCUMENTS

| | | | | |
|---|---|---|---|---|
| 6,118,586 A | * | 9/2000 | Tanabe ................. | G02B 5/1833 349/201 |
| 8,300,512 B2 | * | 10/2012 | Tao ...................... | G02B 5/1828 349/201 |

(Continued)

FOREIGN PATENT DOCUMENTS

| | | |
|---|---|---|
| GB | 2410339 | 7/2005 |
| JP | 2001144310 | 5/2001 |
| JP | 2009137285 | 6/2009 |
| JP | 2013015745 | 1/2013 |
| KR | 100975120 | 8/2010 |

OTHER PUBLICATIONS

International Search Report—PCT/KR2014/010521 dated Feb. 5, 2015.

*Primary Examiner* — Hoan C Nguyen
(74) *Attorney, Agent, or Firm* — Cantor Colburn LLP

(57) ABSTRACT

Provided is a liquid crystalline polymer film where noise caused by diffraction light is removed. The liquid crystalline polymer film is configured to include a first liquid crystalline polymer film formed by simultaneously performing a bottom-up alignment method by a lower alignment film and a top-down alignment method by using a groove structure and a second liquid crystalline polymer film formed on an upper portion of the first liquid crystalline polymer film by over- (Continued)

coating. The second liquid crystalline polymer film is configured so as to satisfy a refractive index matching condition with respect to the first liquid crystalline polymer film, so that noise caused by undesired diffraction phenomenon generated by the groove structure on the upper surface of the first liquid crystalline polymer film is removed.

14 Claims, 15 Drawing Sheets

(52) U.S. Cl.
CPC .. *G02F 1/133711* (2013.01); *G02F 1/133788* (2013.01); *G02F 2001/133715* (2013.01); *G02F 2001/133776* (2013.01)

(58) Field of Classification Search
USPC .......................................................... 349/183
See application file for complete search history.

(56) References Cited

U.S. PATENT DOCUMENTS

| | | | |
|---|---|---|---|
| 2004/0263060 A1* | 12/2004 | Gilmour | G02F 1/133603 313/501 |
| 2009/0147200 A1 | 6/2009 | Okuyama et al. | |
| 2010/0260030 A1 | 10/2010 | Tao et al. | |
| 2016/0070032 A1* | 3/2016 | Kim | G02B 3/005 349/194 |
| 2016/0124239 A1* | 5/2016 | Kim | G02B 3/005 349/194 |

* cited by examiner

US 9,846,266 B2

LIQUID CRYSTALLINE POLYMER FILM WITH DIFFRACTIVE OPTICAL NOISE REMOVED AND METHOD OF MANUFACTURING THE SAME

TECHNICAL FIELD

The present invention relates to a liquid crystalline polymer film and a method of manufacturing the same, and more particularly, to a liquid crystalline polymer film which is aligned by a groove structure and of which diffractive optical noise generated by the groove structure is removed by using an overcoating process and a method of manufacturing the same.

BACKGROUND ART

A material used for manufacturing a liquid crystalline polymer film having a birefringence property has a molecular structure similar to that of a typical liquid crystal before a photocuring reaction is induced by UV irradiation. Each of photocurable liquid crystalline monomer molecules has a rod-shaped molecular structure configured with a hard molecule to induce a liquid crystal phase and one or more photoreactive groups attached to ends thereof, and a photo-initiator is mixed into the material. The aforementioned photocurable liquid crystalline monomer constitutes a liquid crystalline polymer film by polymerization between constituents generated by the UV irradiation.

Since the liquid crystalline polymer film using the photocurable liquid crystalline monomer is formed in a monomer state by a film forming process at the time of inducing alignment according to a condition of an interface, there is an advantage in that relatively good alignment characteristics can be obtained in comparison with the case where the film forming process is performed by using a liquid crystalline polymer material which is polymerized in advance at the time of the film forming process. Therefore, in recent years, the liquid crystalline polymer film is widely used in the fields of display and the fields of optical elements requiring uniform optical anisotropy or patterned optical anisotropy.

FIG. 1A is a conceptual diagram illustrating a state of a photocurable liquid crystalline monomer which is aligned before photocuring, and FIG. 1B is a conceptual diagram illustrating a state of a liquid crystalline polymer film which is aligned and polymerized in a thin-film shape by photocuring reaction.

As described above, due to the existence of the liquid crystalline monomer at the time of inducing the alignment, a film can be easily formed by a coating process such as bar coating or spin coating, and the same condition of alignment film as the case where liquid crystal is aligned is formed in the lower portion, so that the film aligned according to a condition of an interface can be formed as illustrated in FIG. 1A. As illustrated in FIG. 1B, after the alignment is induced, a remaining organic solvent is removed by thermal treatment, and photopolymerization between monomers is induced by UV irradiation, so that a stabilized liquid crystalline polymer film with the alignment retained is formed.

In the formation of the liquid crystalline polymer film, before the photocuring reaction is induced by the UV irradiation, similarly to a typical liquid crystal, in the photocurable liquid crystalline monomer, a degree of alignment in the alignment direction with respect to the alignment axis varies with a temperature condition. A quantitative physical value of the degree of alignment is referred to as an order parameter S, which is expressed by Mathematical Formula 1.

$$S(T) = \left\langle \frac{3\cos^2\theta - 1}{2} \right\rangle \quad \text{[Mathematical Formula 1]}$$

Herein, the order parameter S is a function varying with temperature and indicates an angle between an average molecular axis direction of each liquid crystal molecule or photocurable liquid crystalline monomer molecule in an infinitesimal volume and an axis of each molecule. FIGS. 2A and 2B are a graph illustrating a change in the order parameter S of the liquid crystalline monomer according to temperature and a conceptual diagram for explaining θ. As illustrated in FIGS. 2A and 2B, even in the case of a liquid crystal or a liquid crystalline monomer having a liquid crystal phase at a room temperature, as the temperature is increased, the order parameter S is gradually decreased, and at TNI (nematic-isotropic phase transition temperature), the liquid crystal or the liquid crystalline monomer is phase-transitioned into an isotropic liquid. If S=0, the liquid crystal or the liquid crystalline monomer becomes an isotropic liquid, and the optical anisotropy (birefringence) disappears. As the order parameter is close to S=1, the liquid crystal molecules are well aligned along the alignment direction. In general, the order parameter of the liquid crystal or the liquid crystalline monomer is S<1 at the room temperature, and the case of S=1 indicates a monocrystalline state.

FIG. 3 is a graph illustrating a change of an ordinary refractive index $n_o$ and a change of an extraordinary refractive index $n_e$ of the liquid crystalline monomer according to temperature. As illustrated in FIG. 3, although the ordinary refractive index $n_o$ and the extraordinary refractive index $n_e$ are given in the molecular level of the liquid crystalline monomer, since the refractive index macroscopically measured on the film is obtained with respect to each optical axis as an average value due to the change of the order parameter according to temperature, as the temperature is increased, the extraordinary refractive index $n_e$ is gradually decreased, and the ordinary refractive index $n_o$ is gradually increased. At the temperature equal to or higher than TNI $n_i$ (nematic-isotropic phase transition temperature), the liquid crystalline monomer is phase-transitioned into an isotropic liquid, and the optical anisotropy disappears, so that the liquid crystalline monomer has a single refractive index $n_i$. Herein, $$n_i = \frac{n_e + 2n_o}{3}.$$

Namely, the ordinary refractive index and the extraordinary refractive index of the liquid crystalline monomer are a function of temperature.

On the other hand, in order to obtain the photocurable liquid crystalline polymer film aligned as illustrated in FIG. 1B, the lower substrate where coating is to be performed needs to be applied with an alignment process. In general, this alignment method is achieved by forming the film by coating a PVA-based or PI-based alignment film, and after that, defining the alignment direction of the liquid crystalline monomer formed on the film by a rubbing process. Alternatively, by irradiating an alignment film having a photo-alignment characteristic with polarized UV, alignment of the photocurable liquid crystalline monomer formed on the alignment film can be induced. At this time, a multi-aligned liquid crystalline polymer film can be formed by forming the alignment of the lower substrate through spatial multiple division. As an example of the multi-aligned liquid crystalline polymer film, there is a patterned retarder implementing a 3D image in a polarized glasses method.

However, there is a problem in that, as a thickness of a to-be-formed liquid crystalline polymer film is increased, a distance to the lower alignment film is increased, so that the alignment effect due to the lower alignment film is gradually decreased. In addition, there is a problem in that, as it goes to an upper portion of the liquid crystalline polymer film, the alignment state becomes poor. As another example of the 3D display implementing method, there is a polarization-dependent lens array using a liquid crystalline polymer required by a 2D/3D switching display. In order to manufacture a lens array having a short focal length by using a liquid crystalline polymer, each lens is formed to have sufficiently different phase retardation, and thus, a liquid crystalline polymer film is necessarily formed to have a large thickness.

In this case, in order to solve the above-described problems, since sufficient alignment effects cannot be obtained by only the bottom-up alignment by the lower alignment film, alignment needs to be induced from an upper portion by a top-down alignment method in the formation of the liquid crystalline polymer film. According to the top-down alignment method, alignment can be additionally induced by forming an interface having a groove structure in the upper portion thereof. The direction of the above-described top-down alignment can be induced along the groove direction.

FIGS. 4A and 4B are polarizing microscope pictures illustrating alignment states of thick photocurable liquid crystalline polymer film formed with a thickness of 20 μm, FIG. 4A is a picture with respect to the polarization axis of a polarizing microscope, and FIG. 4B is a picture in the case of a sample is disposed at 45 degrees with respect to the polarization axis of the polarizing microscope. In FIGS. 4A and 4B, in order to test the influence of the upper alignment in the thick liquid crystalline polymer film, a portion of the sample is aligned with only the lower alignment condition, and the remaining portion is aligned with the lower alignment condition and the upper alignment condition. In each of the pictures of FIGS. 4A and 4B, the left image is an alignment picture of a region formed with only the lower alignment condition by a rubbed PI film, and the right image is an alignment picture of a region formed by alignment induced with the lower alignment condition by the rubbed PI film and the upper alignment condition by the groove structure. As illustrated in the polarizing microscope pictures obtained by observation while changing the condition of an angle between a transmission axis of a polarizer and the alignment axis, it can be seen that, in the case of the thick liquid crystalline polymer film, uniform alignment cannot be induced by only the lower alignment film, and however, in the case of utilizing the bottom-up and top-down alignment effect simultaneously, uniform alignment state can be obtained.

However, as described above, in the inducement of the upper alignment, a groove pattern is performed in the upper portion of the formed liquid crystalline polymer film by the groove structure. The groove pattern formed on the upper surface of the liquid crystalline polymer film causes a problem in that undesired optical diffraction phenomenon occurs and, thus, optical noise is generated.

For example, in the case of forming a polarization-dependent liquid crystalline polymer lens array, besides the condensing effect of the lens, diffraction light is generated, and thus, optical noise is generated. The optical noise causes a noise image in display of a 3D image or a 2D image. Therefore, an additional technique for removing the optical noise caused by the diffraction light is needed.

DISCLOSURE

Technical Problem

In order to solve the above-described problems, the present invention is to provide a liquid crystalline polymer film where alignment is performed in a top-down alignment method by using a groove structure, and noise caused by undesired diffraction phenomenon generated by the groove structure and a method of manufacturing the liquid crystalline polymer film.

Technical Solution

According to a first embodiment of the present invention, there is provided a liquid crystalline polymer film where diffraction optical noise is removed, including: a transparent substrate; an alignment film which is formed on the transparent substrate; a first liquid crystalline polymer film which is formed on the alignment film and has a groove structure on an upper surface thereof, the first liquid crystalline polymer film being aligned by the alignment film and by the groove structure; and a second liquid crystalline polymer film which is formed on the upper surface of the first liquid crystalline polymer film, the second liquid crystalline polymer film being aligned by the groove structure of the first liquid crystalline polymer film, wherein refractive indexes of the first liquid crystalline polymer film and the second liquid crystalline polymer film are matched with each other.

According to a second embodiment of the present invention, there is provided a liquid crystalline polymer film where diffraction optical noise is removed, including: a lens structure which is configured with a transparent material and has a reverse lens shape; a first liquid crystalline polymer film which is formed inside the lens structure and has a groove structure on an upper surface thereof, the first liquid crystalline polymer film being aligned by the groove structure; and a second liquid crystalline polymer film which is formed on the upper surface of the first liquid crystalline polymer film, the second liquid crystalline polymer film being aligned by the groove structure of the first liquid crystalline polymer film, wherein refractive indexes of the first liquid crystalline polymer film and the second liquid crystalline polymer film are matched with each other.

In the liquid crystalline polymer film according to the first and second aspects, preferably, the first liquid crystalline polymer film is formed by aligning a first photocurable monomer material and, after that, by performing photocuring.

In the liquid crystalline polymer film according to the first and second aspects, preferably, the refractive index includes both of an ordinary refractive index and an extraordinary refractive index.

In the liquid crystalline polymer film according to the first and second aspects, preferably, the second photocurable monomer material constituting the second liquid crystalline polymer film is formed with the same material as a material constituting the first liquid crystalline polymer film, is formed as a mixture of at least two or more types of photocurable monomer materials, is formed with a mixture of a single photocurable monomer material and liquid crystal, or is formed with a mixture of at least two or more types of photocurable monomer materials and liquid crystal.

According to a third embodiment of the present invention, there is provided a method of manufacturing a liquid crystalline polymer film where diffraction optical noise is removed, including: a step (a) of forming an alignment film on a transparent substrate; a step (b) of forming a first liquid crystalline polymer film by coating the alignment film with a first photocurable monomer material, forming a groove structure on an upper surface thereof, and after that, performing photocuring at a predetermined first temperature; and a step (c) of forming a second liquid crystalline polymer film of which refractive index is matched with a refractive index of the first liquid crystalline polymer film by coating an upper portion of the first liquid crystalline polymer film with a second photocurable monomer material and performing photocuring at a predetermined second temperature.

In the method of manufacturing the liquid crystalline polymer film according to the third aspect, preferably, the step (b) includes: a step (b1) of coating the alignment film with the first photocurable monomer material; a step (b2) of disposing the groove structure on the upper surface of the coated first photocurable monomer material and performing alignment; a step (b3) of performing photocuring at a predetermined first temperature; and a step (b4) of removing the stamp, and the first liquid crystalline polymer film is formed on the alignment film.

In the method of manufacturing the liquid crystalline polymer film according to the third aspect, preferably, the step (c) includes: a step (c1) of coating the upper surface of the first liquid crystalline polymer film with the second photocurable monomer material; and a step (c2) of photocuring the coated second photocurable monomer material at a predetermined second temperature, and the second liquid crystalline polymer film is formed on the first liquid crystalline polymer film.

According to a fourth embodiment of the present invention, there is provided a method of manufacturing a liquid crystalline polymer film where diffraction optical noise is removed, including: a step (a) of forming a transparent lens structure having a reverse lens shape; a step (b) of forming a first liquid crystalline polymer film by coating an inner portion of the lens structure with a first photocurable monomer material, forming a groove structure on an upper surface thereof, and after that, performing photocuring at a predetermined first temperature; and a step (c) of forming a second liquid crystalline polymer film of which refractive index is matched with a refractive index of the first liquid crystalline polymer film by coating an upper portion of the first liquid crystalline polymer film with a second photocurable monomer material and performing photocuring at a predetermined second temperature.

In the method of manufacturing the liquid crystalline polymer film according to the fourth aspect, preferably, the method further includes a step of forming an alignment film on an inner surface of the lens structure after the step (a).

In the method of manufacturing the liquid crystalline polymer film according to the third and fourth aspects, preferably, the first temperature and the second temperature are determined as temperatures satisfying refractive index matching conditions of the first liquid crystalline polymer film and the second liquid crystalline polymer film.

Advantageous Effects

In a liquid crystalline polymer film according to the present invention, alignment is performed by using a groove structure, and undesired diffraction light caused by the groove structure can be removed.

FIGS. 9A and 9B are diagrams illustrating comparison of diffraction light characteristics between a liquid crystalline polymer film manufactured by using a patterned retarder in the related art and a liquid crystalline polymer film according to the first embodiment of the present invention. FIG. 9A illustrates characteristics of diffraction light with respect to incident light in the liquid crystalline polymer film in the related art where a groove structure for alignment formed on the surface remains. FIG. 9B illustrates characteristics where diffraction light with respect to incident light is removed in the liquid crystalline polymer film according to the present invention where a second liquid crystalline polymer film satisfying a refractive index matching condition is formed on the groove structure for alignment formed on the surface.

As illustrated in FIG. 9A, if the groove structure remains on the surface, the groove structure converts linearly polarized light emitted from a panel into right-circularly polarized light and left-circularly polarized light, and at the same time, noise light caused by the diffraction exists. On the other hand, as illustrated in FIG. 9B, in the liquid crystalline polymer film according to the first embodiment of the present invention, the diffraction light is removed by the overcoated second liquid crystalline polymer film, so that only the polarization pattern where the incident linearly polarized light is patterned into the right-circularly polarized light and the left-circularly polarized light is obtained.

FIGS. 10A & 10B and FIGS. 11A & 11B are diagrams illustrating comparison of diffraction light characteristics between a liquid crystalline polymer film in the related art where a groove structure remains on the upper surface and an overcoated liquid crystalline polymer film according to the second embodiment of the present invention in the liquid crystalline polymer film manufactured as a polarization-dependent lens. FIG. 10A and FIG. 11A illustrate diffraction light characteristics in the case where linearly polarized light in the X axis direction and the Y axis direction is incident in the liquid crystalline polymer film in the related art where the groove structure for alignment formed on the surface remains, respectively. FIG. 10B and FIG. 11B illustrate characteristics where diffraction light is removed in the case where linearly polarized light in the X axis direction and the Y axis direction is incident in the liquid crystalline polymer film according to the second embodiment of the present invention where a second liquid crystalline polymer film satisfying a refractive index matching condition is formed on the groove structure for alignment formed on the surface, respectively.

In the above-described liquid crystalline polymer film manufactured as a polarization-dependent lens, the ordinary refractive index of the first liquid crystalline polymer film has a refractive index matching condition with respect to an isotropic refractive index of the lens structure having a reverse shape of lens, and the extraordinary refractive index has a refractive index mismatching condition with respect to a material of the lens structure. In the liquid crystalline polymer film manufactured as a polarization-dependent lens, in the case where the linearly polarized light parallel to the extraordinary refractive index axis of the first liquid crystalline polymer film is incident according to the incident polarization condition, the light is condensed by the convex lens effect; and in the case where the linearly polarized light parallel to the ordinary refractive index axis, the condensing characteristic disappears. Namely, the condensing characteristic is switched on and off according to the incident polarization. At this time, as illustrated in FIG. 10A and FIG.

11A, in the case where the groove structure remains on the surface of the first liquid crystalline polymer film, the linearly polarized light emitted from the panel passes through the liquid crystalline polymer lens layer to be condensed or to straightly propagate according to the incident polarization condition, and at the time, the diffraction optical noise is generated by the groove structure on the surface. As illustrated in FIG. 10B and FIG. 11B, in the liquid crystalline polymer film according to the second embodiment of the present invention, the condensing characteristic can be controlled according to condition of the linearly polarized light which is incident in the diffraction-light removed state.

FIGS. 12A and 12B are polarizing microscope pictures obtained by observation of the first and second liquid crystalline polymer layers in the liquid crystalline polymer film manufactured as a polarization-dependent lens. Referring to FIGS. 12A and 12B, it can be understood that uniform alignment is induced in the alignment direction.

FIGS. 13A and 13B are CCD image condensing pictures obtained by observation on a focal plane of the liquid crystalline polymer film manufactured by using a polarization-dependent lens array. FIG. 13A is a picture with respect to a polarization-dependent liquid crystalline polymer lens array in the related art manufactured by using only the first liquid crystalline polymer layer, and FIG. 13B is a picture with respect to a polarization-dependent liquid crystalline polymer lens array including first and second liquid crystalline polymer layers according to the second embodiment of the present invention, and it can be understood that diffraction light is removed.

BEST MODE

In a liquid crystalline polymer film according to the present invention, a bottom-up alignment method by an alignment film and a top-down alignment method using a groove structure can be simultaneously performed, and noise caused by undesired diffraction phenomenon generated by the groove structure can be removed by an overcoating process.

<Liquid Crystalline Polymer Film>

Hereinafter, a structure of a liquid crystalline polymer film according to the first embodiment of the present invention will be described in detail with reference to the attached drawings. The liquid crystalline polymer film according to the first embodiment of the present invention is manufactured as a pattern retarder implementing a 3D image by a polarizing glasses method.

Figure 1A:
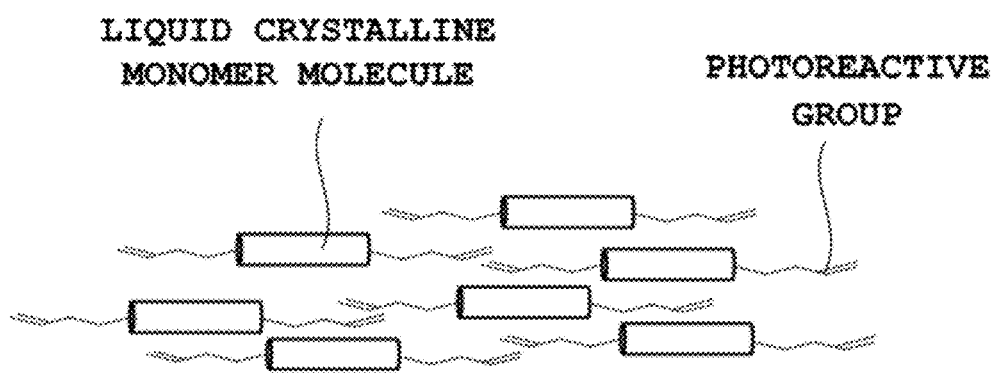
FIG. 1A is a conceptual diagram illustrating a state of a photocurable liquid crystalline monomer which is aligned before photocuring.
Figure 1B:
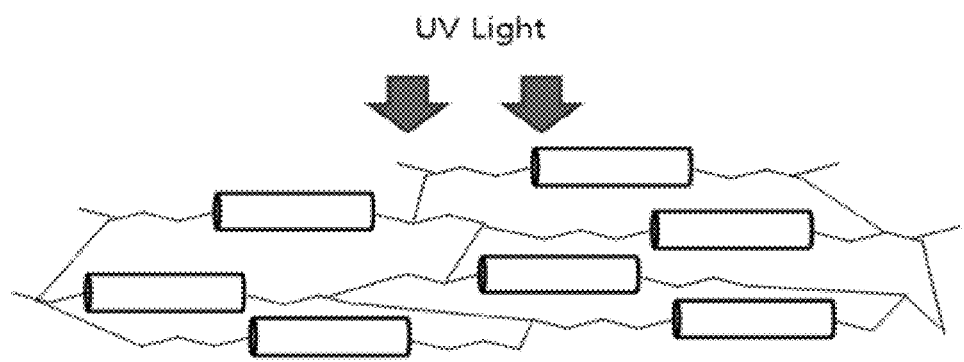
FIG. 1B is a conceptual diagram illustrating a state of a liquid crystalline polymer film which is aligned and polymerized in a thin-film shape by photocuring reaction.
Figure 2A:
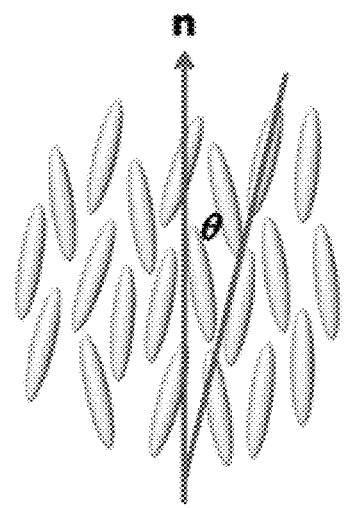
FIGS. 2A and 2B are a graph illustrating a change in the order parameter S of the liquid crystalline monomer according to temperature.
Figure 2B:
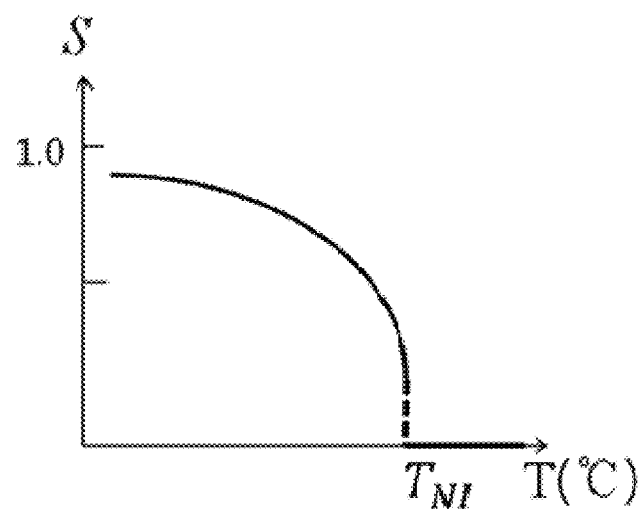
Figure 3:
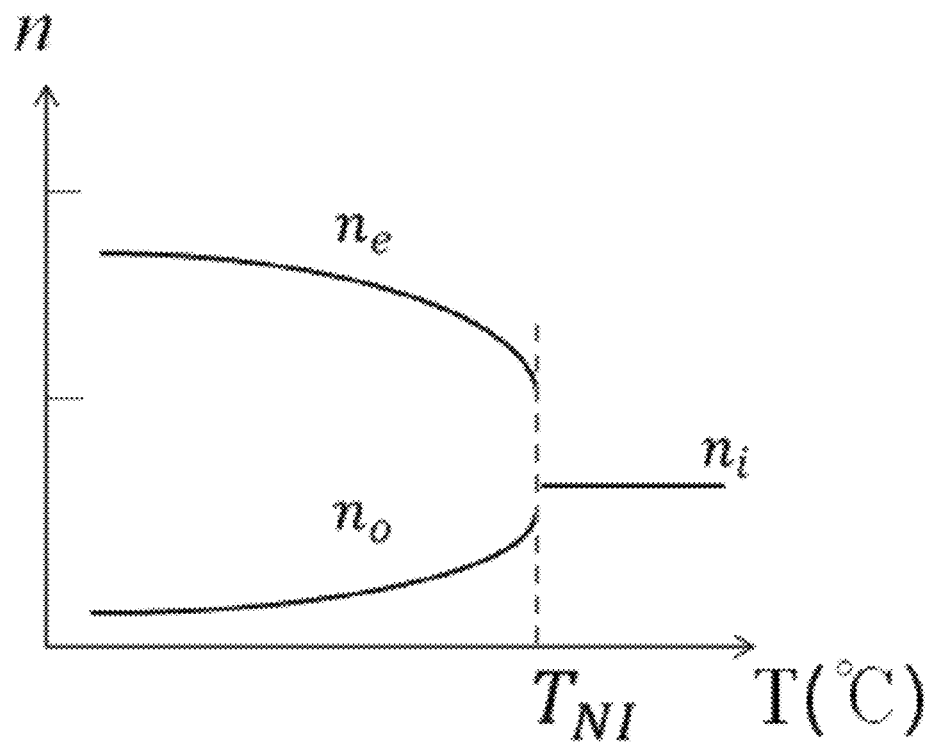
FIG. 3 is a graph illustrating a change of an ordinary refractive index $n_o$ and a change of an extraordinary refractive index $n_e$ of the liquid crystalline monomer according to temperature.
Figure 4A:
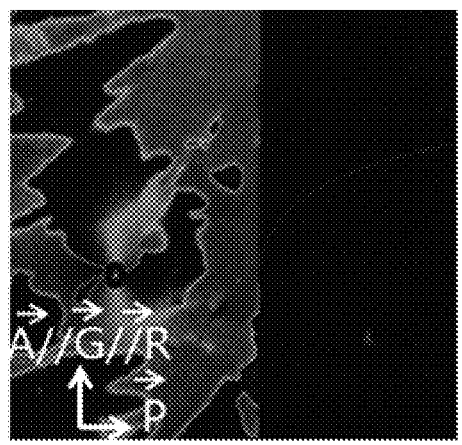
FIGS. 4A and 4B are polarizing microscope pictures illustrating alignment states of thick photocurable liquid crystalline polymer film formed with a thickness of 20 μm.
Figure 4B:
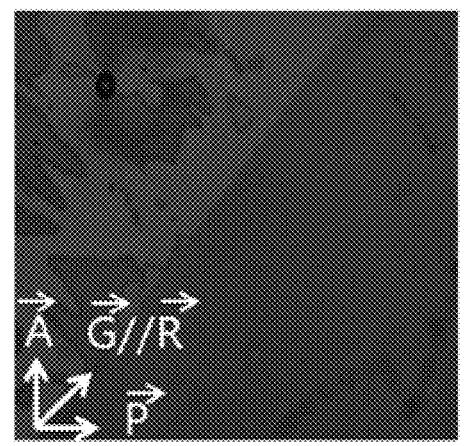
Figure 5:
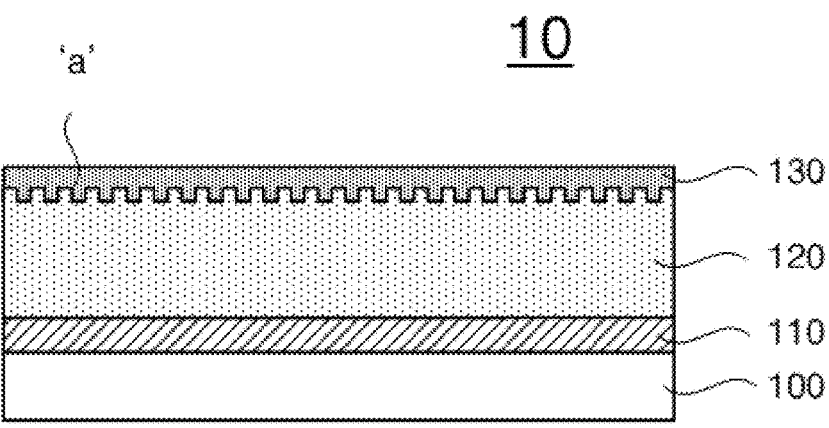
FIG. 5 is a cross-sectional diagram illustrating a liquid crystalline polymer film according to a first embodiment of the present invention.

FIG. 5 is a cross-sectional diagram illustrating the liquid crystalline polymer film according to the first embodiment of the present invention. Referring to FIG. 5, a liquid crystalline polymer film 10 according to the embodiment is configured to include a transparent substrate 100, an alignment film 110, a first liquid crystalline polymer film 120, and a second liquid crystalline polymer film 130.

The alignment film 110 is aligned along a predetermined direction.

The first liquid crystalline polymer film 120 is formed on the lower alignment film and includes a groove structure 'a' configured with fine grooves on an upper surface thereof. The grooves of the groove structure are configured at a scale of a nanometer to a scale of a micrometer, and particularly, by taking into consideration of alignment characteristics, the grooves may be preferably configured at a scale of a nanometer to a scale of several micrometers. The direction of the groove structure is preferably coincident with the alignment direction of the alignment film. Namely, the lower alignment film and the groove structure are preferably aligned in the same direction.

On the other hand, in the case where the liquid crystalline polymer film according to the embodiment is manufactured as a pattern retarder, the alignment film is preferably patterned to be aligned, and the groove structure of the first liquid crystalline polymer film is also preferably formed corresponding to the patterning of the alignment film. Therefore, the alignment direction of the patterned alignment film and the direction of the patterned groove structure on the upper portion thereof are preferably coincident with each other.

The first liquid crystalline polymer film is formed by photocuring in the state where the first photocurable monomer is coated on the lower alignment film, and after that, is aligned by the bottom-up and top-down alignment methods by using the lower alignment film and the groove structure on the upper surface.

The second liquid crystalline polymer film 130 is formed with a small thickness on the upper surface of the first liquid crystalline polymer film 120. The second liquid crystalline polymer film is formed by coating with the second photocurable monomer material, performing alignment by the groove structure on the upper surface of the first liquid crystalline polymer film, and performing photocuring. The thickness of the second liquid crystalline polymer film is preferably formed to be equal to or smaller than the thickness where alignment can be performed by the lower groove structure and is preferably formed to be larger than at least the thickness of the groove on the upper surface of the first liquid crystalline polymer film.

The first liquid crystalline polymer film and the second liquid crystalline polymer film are configured so that the refractive indexes are matched with each other with respect to the ordinary refractive index and the extraordinary refractive index.

A second photocurable monomer material constituting the second liquid crystalline polymer film is configured with the same material as a material constituting the second liquid crystalline polymer film, is configured with a mixture of two or more types of photocurable monomer materials, or is configured with a mixture of a single or different types of photocurable monomer materials and a small amount of liquid crystal. Herein, in the case where the second photocurable monomer material is configured with a mixture of photocurable monomer materials and a small amount of liquid crystal, the mixed amount of liquid crystal is preferably an amount where photocuring can be performed by UV or the like.

Hereinafter, a structure of the liquid crystalline polymer film according to the second embodiment of the present invention will be described in detail. The liquid crystalline polymer film according to the second embodiment of the present invention is manufactured as a polarization-dependent lens.

Figure 6:
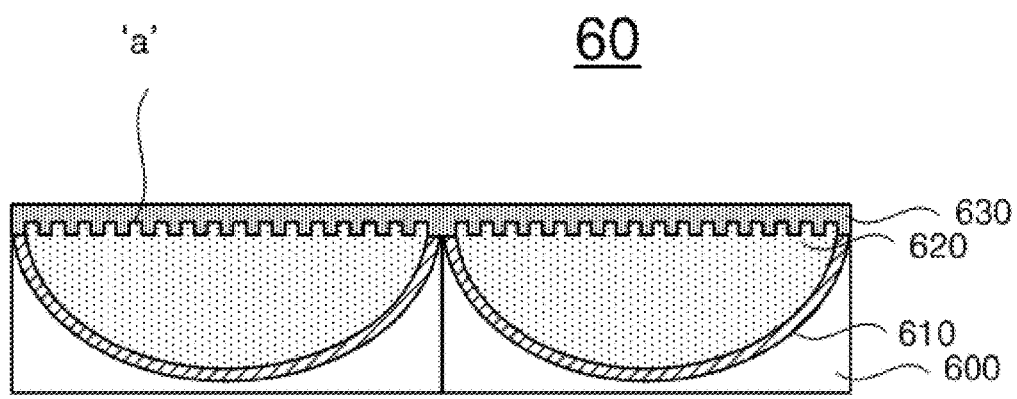
FIG. 6 is a cross-sectional diagram illustrating the liquid crystalline polymer film according to the second embodiment of the present invention.

FIG. 6 is a cross-sectional diagram illustrating the liquid crystalline polymer film according to the second embodiment of the present invention. Referring to FIG. 6, the liquid crystalline polymer film 60 according to the embodiment is configured to include a transparent lens structure 600 having a reverse lens structure, an alignment film 610 formed on a lower surface inside the lens structure, a first liquid crystalline polymer film 620 formed inside the lens structure, and a second liquid crystalline polymer film 630 formed on the first liquid crystalline polymer film.

As illustrated in FIG. 6, the lens structure 600 is configured in a reverse shape of a GRIN lens or is configured in a reverse shape of a FRESNEL lens. As illustrated in FIG. 6, the lens structure is configured in a reverse shape of a GRIN lens, and it is preferable that the alignment film 610 be formed.

On the other hand, in the case where the lens structure is configured in a reverse shape of the FRESNEL lens formed with a smaller thickness than that of the GRIN lens, the lens structure may be formed without an alignment film. In this case, since the thickness of the first liquid crystalline polymer film is small, sufficient alignment can be achieved by only the groove structure formed on the upper surface.

The first liquid crystalline polymer film 620 is formed inside the lens structure and has a groove structure configured with fine grooves on the upper surface. The first liquid crystalline polymer film is formed by photocuring in the state where the liquid crystalline monomer is coated inside the lens structure is aligned by the lower alignment film and the groove structure on the upper surface. The ordinary refractive index of the first liquid crystalline polymer film has a refractive index matching condition with respect to an isotropic refractive index of the lens structure having a reverse lens shape, and the extraordinary refractive index has a refractive index mismatching condition with respect to a material of the lens structure.

The second liquid crystalline polymer film 630 is formed on the upper surface of the first liquid crystalline polymer film, and since the material and configuration thereof are the same as those of the second liquid crystalline polymer film according to the first embodiment, the redundant description thereof is omitted.

<Method of Manufacturing Liquid Crystalline Polymer Film>

Figure 7:
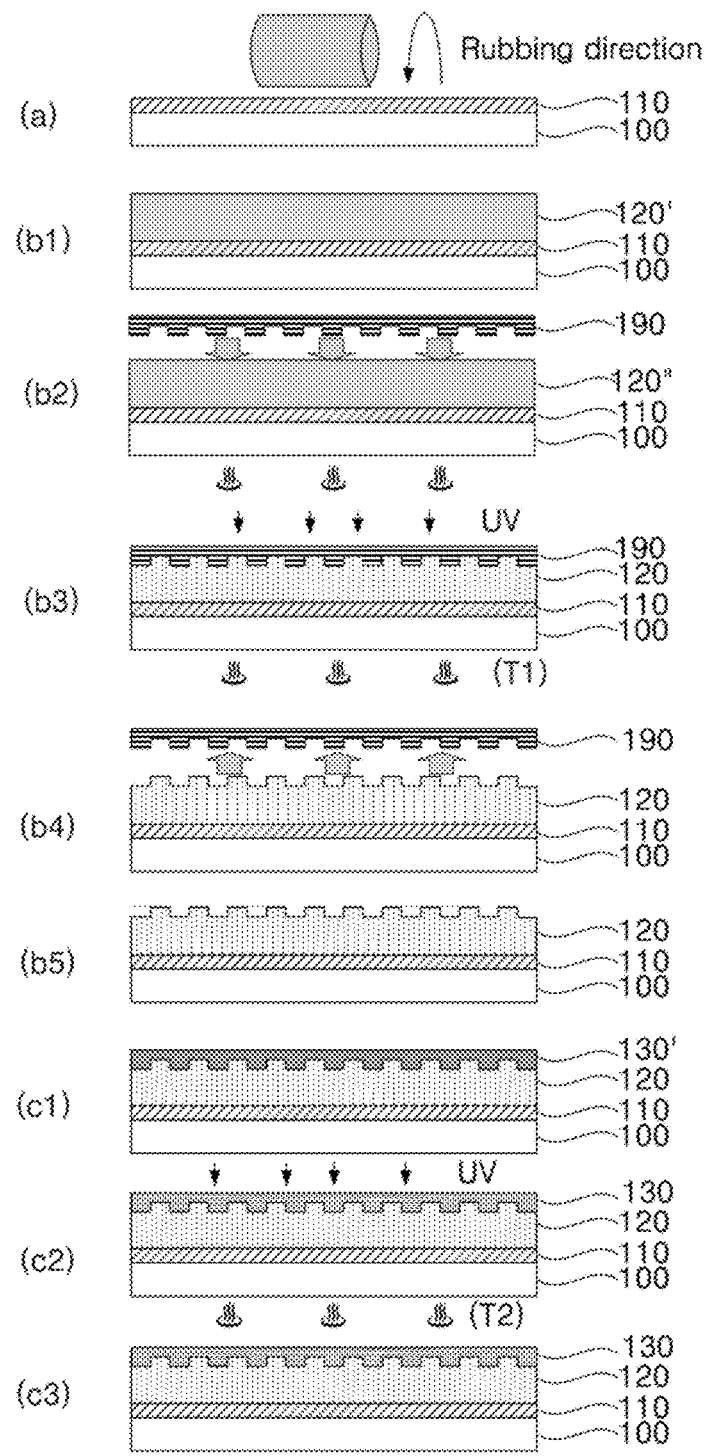
FIG. 7 is cross-sectional diagrams illustrating a sequence of processes of manufacturing the liquid crystalline polymer film according to the first embodiment of the present invention.

Hereinafter, a method of manufacturing the liquid crystalline polymer film according to the first embodiment of the present invention will be described in detail. FIG. 7 is cross-sectional diagrams illustrating a sequence of processes of manufacturing the liquid crystalline polymer film according to the first embodiment of the present invention.

Referring to FIG. 7, the method of manufacturing the liquid crystalline polymer film according to the present invention is mainly configured to include a step ( a ) of forming an alignment film on a substrate, steps (b1 ) to (b5) of forming a first liquid crystalline polymer film on the alignment film, and steps (c1) to (c3) of forming a second liquid crystalline polymer film on the first liquid crystalline polymer film. Hereinafter, the steps will be described in detail.

First, an alignment film forming process (step (a)) will be described in detail. The alignment film 110 is formed by coating the transparent substrate 100 with an alignment material, performing thermal treatment, and performing an alignment process by performing a rubbing process in the direction of alignment of the photocurable polymer material. The alignment film 110 is preferably formed by spin-coating the substrate 1000 with an alignment material. In addition, as described above, beside the alignment by the rubbing process, an optical alignment process may be performed according to a material of the alignment film.

Next, the first liquid crystalline polymer film forming processes (steps (b1) to (b5) on the alignment film will be described in detail. First, the alignment film 110 is uniformly coated with a photocurable liquid crystalline monomer material 120' at a nematic-isotropic phase transition temperature (TNI) or more of the photocurable liquid crystalline monomer material (step (b1)). Next, a stamp 190 of the groove structure where fine grooves are formed is disposed on the upper surface of the coated photocurable liquid crystalline monomer material, and after that, alignment is induced in a nematic phase temperature range by performing a bottom-up alignment method by the lower alignment film and a top-down alignment method by the groove structure (step (b2)). Next, the aligned photocurable liquid crystalline monomer 120" is photocured by UV irradiation at a predetermined first temperature T1 (step (b3)). After that, the stamp 190 of the groove structure is removed (step (b4)). Next, the first liquid crystalline polymer film 120 where the groove structure is formed on the upper surface thereof is achieved (step (b5)).

Next, the second liquid crystalline polymer film forming processes (steps (c1) to (c3)) on the first liquid crystalline polymer film will be described in detail. First, the first liquid crystalline polymer film is coated with a second photocurable liquid crystalline monomer material 130' (step (c1)). The second photocurable liquid crystalline monomer material 130' is aligned by the groove structure on the upper surface of the first liquid crystalline polymer film.

Next, the aligned second photocurable liquid crystalline monomer material 130' is irradiated with UV at a predetermined second temperature T2 (step (c2)). Photo-polymerization is induced, so that the photocured second liquid crystalline polymer film 130 is achieved (step (c3)).

Herein, the first temperature T1 and the second temperature T2 need to be determined so that the extraordinary refractive indexes and the ordinary refractive indexes of the first liquid crystalline polymer film and the second liquid crystalline polymer film satisfy the refractive index matching conditions.

Figure 8:
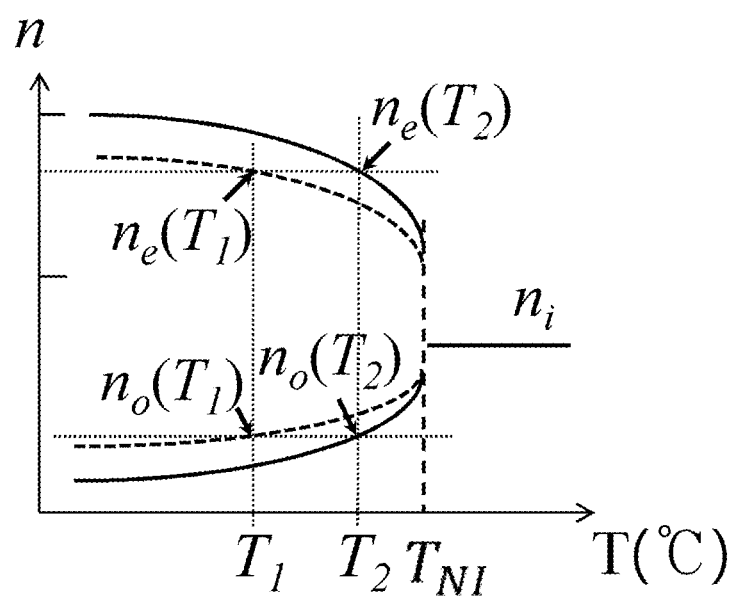
FIG. 8 is a diagram illustrating a change (indicated by a dotted line) of the ordinary refractive index and the extraordinary refractive index according to a temperature condition at the UV photocuring of the first liquid crystalline polymer film and a change (indicated by a solid line) of the ordinary refractive index and the extraordinary refractive index according to a temperature condition at the UV photocuring of the second liquid crystalline polymer film.
Figure 9A:
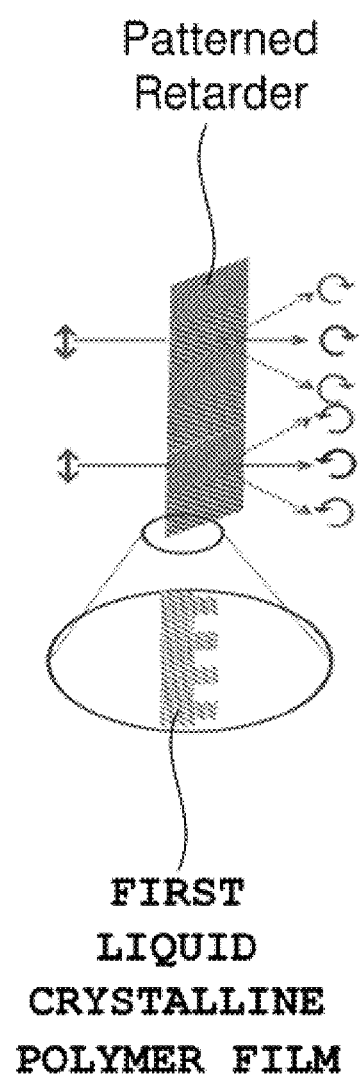
FIGS. 9A and 9B are diagrams illustrating comparison of diffraction light characteristics between a liquid crystalline polymer film manufactured by using a patterned retarder in the related art and a liquid crystalline polymer film according to the first embodiment of the present invention.
Figure 9B:
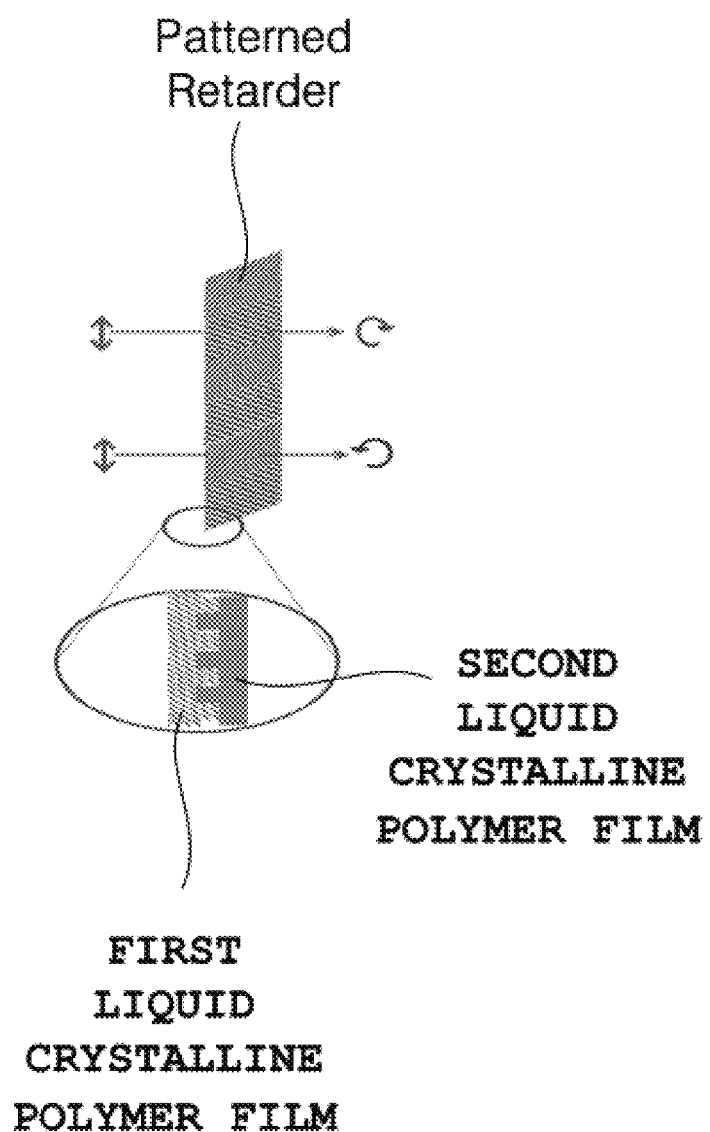
Figure 10A:
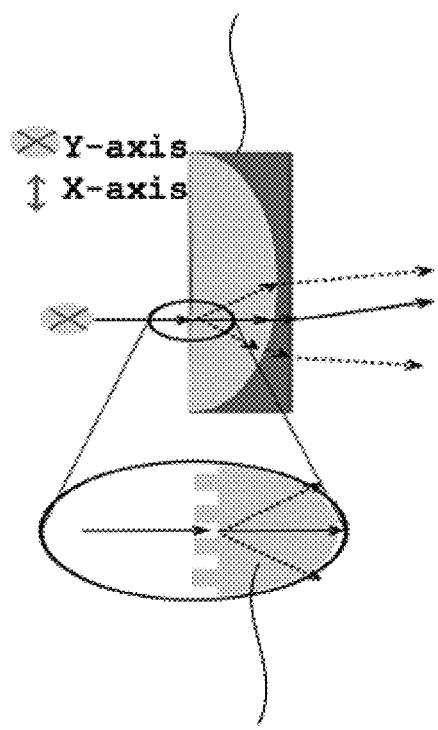
FIGS. 10A and 10B and FIGS. 11A and 11B are diagrams illustrating comparison of diffraction light characteristics between a liquid crystalline polymer film in the related art where a groove structure remains on the upper surface and an overcoated liquid crystalline polymer film according to the second embodiment of the present invention in the liquid crystalline polymer film manufactured as a polarization-dependent lens.
Figure 10B:
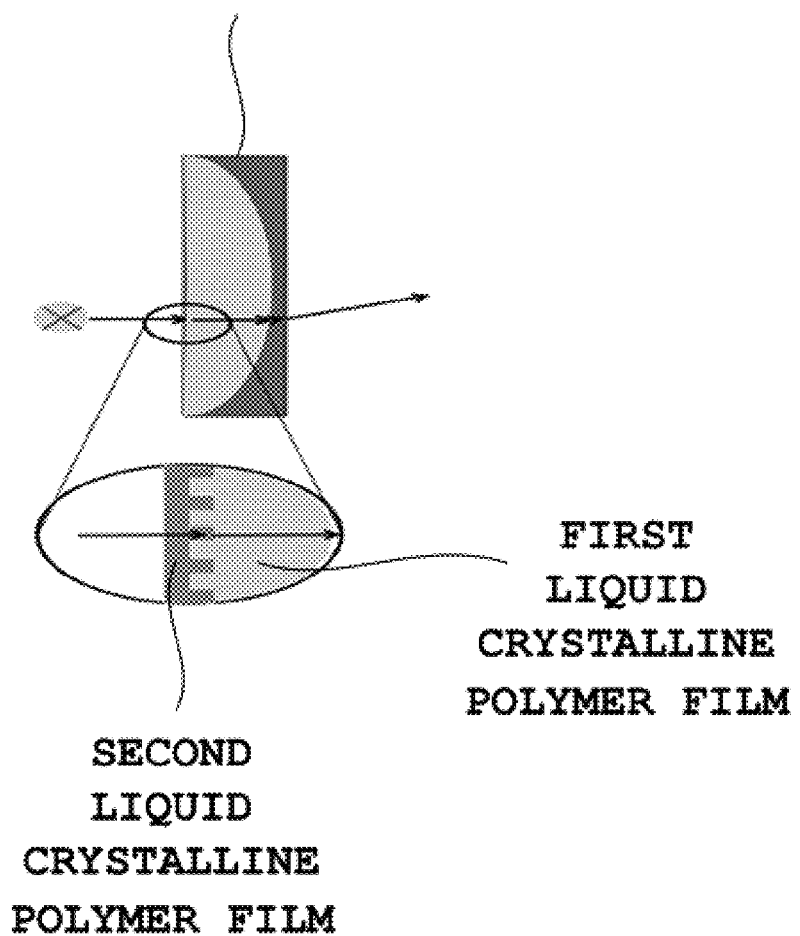
Figure 11A:
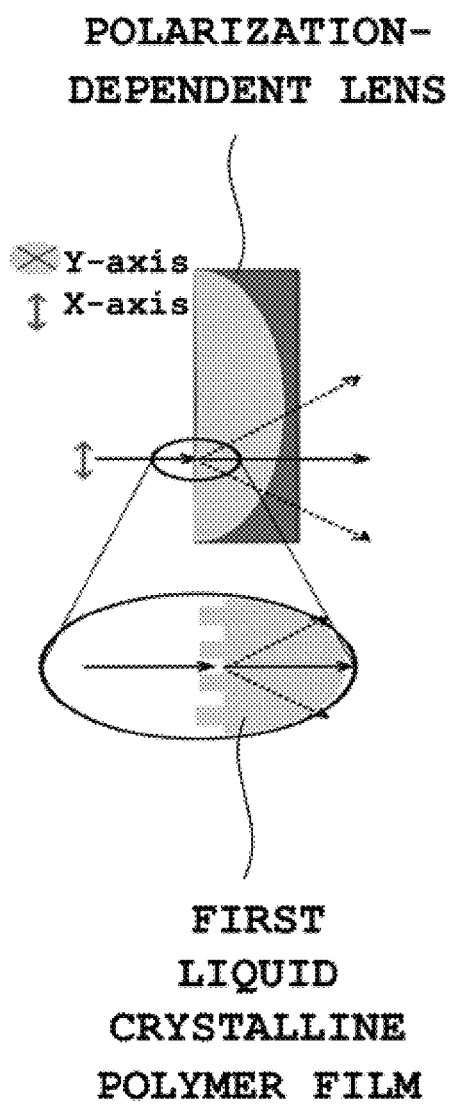
Figure 11B:
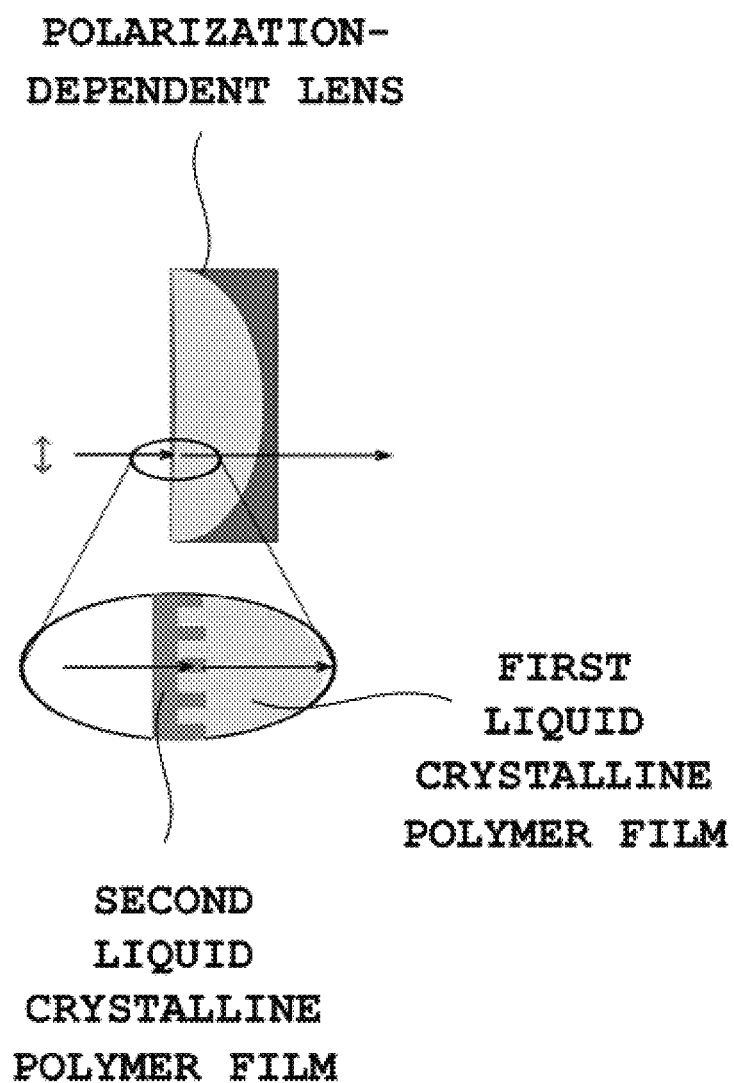
Figure 12A:
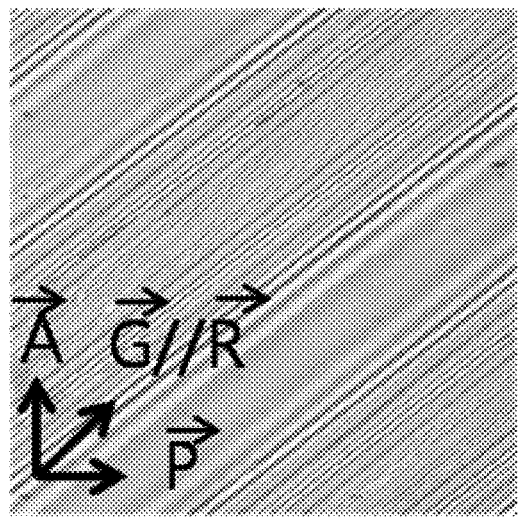
FIGS. 12A and 12B are polarizing microscope pictures obtained by observation of the first and second liquid crystalline polymer layers in the liquid crystalline polymer film manufactured as a polarization-dependent lens.
Figure 12B:
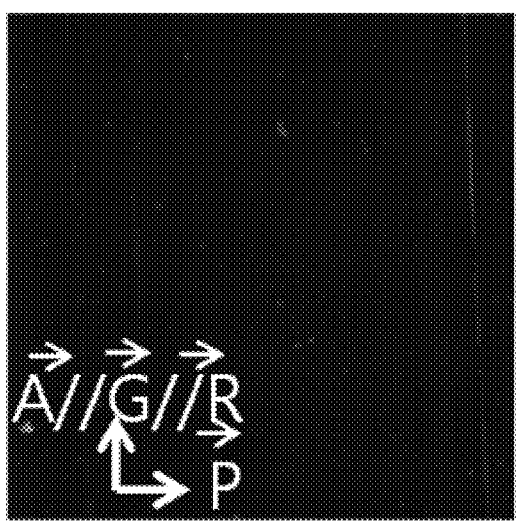
Figure 13A:
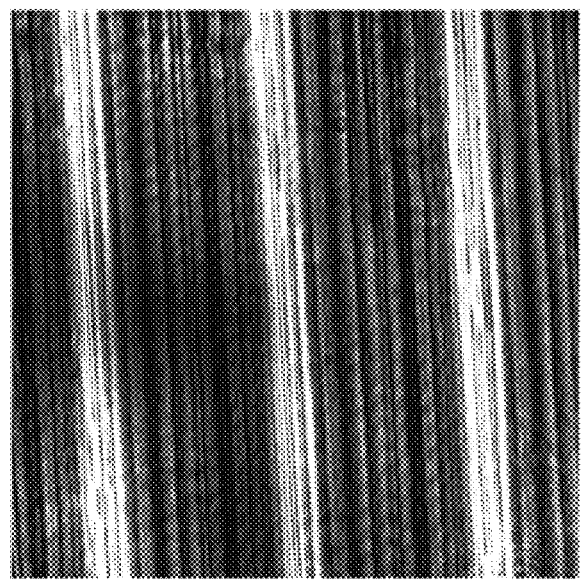
FIGS. 13A and 13B are CCD image condensing pictures obtained by observation on a focal plane of the liquid crystalline polymer film manufactured by using a polarization-dependent lens array.
Figure 13B:
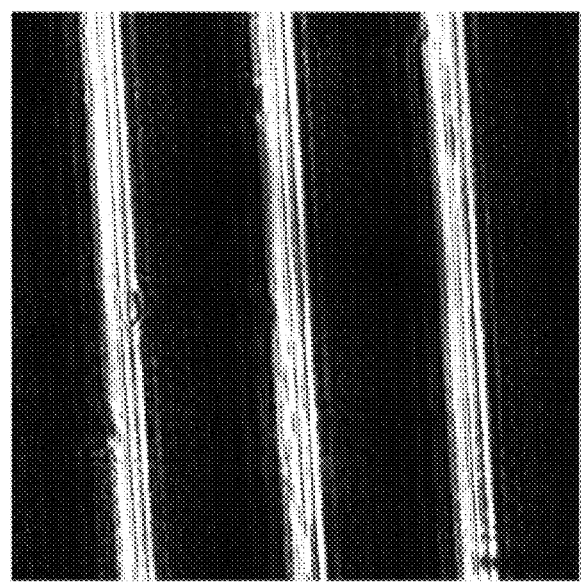

Hereinafter, the first temperature T1 and the second temperature T2 of the temperature conditions for the photocuring of the first liquid crystalline polymer film and the second liquid crystalline polymer film will be described in detail with reference to FIG. 8. FIG. 8 is a diagram illustrating a change (indicated by a dotted line) of the ordinary refractive index and the extraordinary refractive index according to a temperature condition at the UV photocuring of the first liquid crystalline polymer film and a change (indicated by a solid line) of the ordinary refractive index and the extraordinary refractive index according to a temperature condition at the UV photocuring of the second liquid crystalline polymer film.

Referring to FIG. 8, the first temperature and the second temperature satisfy the temperature condition that the first liquid crystalline polymer film and the second liquid crystalline polymer film have the same ordinary refractive index and the same extraordinary refractive index. Therefore, by performing the UV photocuring on the first liquid crystalline polymer film at the first temperature and by performing the UV photocuring on the second liquid crystalline polymer film at the second temperature, the first liquid crystalline polymer film and the second liquid crystalline polymer film are formed to have the same extraordinary refractive index and the same ordinary refractive index and to satisfy the refractive index matching condition with respect to an arbitrary incident polarization. As a result, the diffraction light generated by the groove structure formed on the upper surface of the first liquid crystalline polymer film can be removed.

Due to the above-described processes, the photocured liquid crystalline polymer film having a birefringence property where undesired diffraction light characteristics generated by the groove structure are removed is achieved.

On the other hand, the liquid crystalline polymer film according to the second embodiment of the present invention can be manufactured by using a transparent lens structure having a reverse lens structure instead of a transparent substrate in the above-described processes.

While the present invention has been particularly shown and described with reference to exemplary embodiments thereof, it will be understood by those skilled in the art that various changes and modifications in form and details may be made therein without departing from the spirit and scope of the present invention as defined by the appended claims.

INDUSTRIAL APPLICABILITY

A liquid crystalline polymer film according to the present invention can be applied to manufacturing a patterned retarder and a polarization-dependent lens array for a 2D/3D switching display panel. In addition, a method of manufacturing a liquid crystalline polymer film according to the present invention can be widely used in the fields of display and optical element requiring uniform optical anisotropy and patterned optical anisotropy.

The invention claimed is:

1. A liquid crystalline polymer film where diffraction optical noise is removed, comprising:
    a transparent substrate;
    an alignment film which is formed on the transparent substrate;
    a first liquid crystalline polymer film which is formed on the alignment film and has a groove structure on an upper surface thereof, the first liquid crystalline polymer film being aligned by the alignment film and by the groove structure; and
    a second liquid crystalline polymer film which is formed on the upper surface of the first liquid crystalline polymer film, the second liquid crystalline polymer film being aligned by the groove structure of the first liquid crystalline polymer film,
    wherein ordinary refractive indexes of the first liquid crystalline polymer film and the second liquid crystalline polymer film are matched with each other, and extraordinary refractive indexes of the first liquid crystalline polymer film and the second liquid crystalline polymer film are matched with each other, and
    wherein the second liquid crystalline polymer film is configured to remove diffraction light caused by the groove structure of the first liquid crystalline polymer film.

2. The liquid crystalline polymer film according to claim 1, wherein the first liquid crystalline polymer film is formed by aligning a first photocurable monomer material and, after that, by performing photocuring.

3. The liquid crystalline polymer film according to claim 1, wherein the second liquid crystalline polymer film is formed by aligning a second photocurable monomer material and, after that, performing photocuring.

4. The liquid crystalline polymer film according to claim 3, wherein the second photocurable monomer material constituting the second liquid crystalline polymer film is formed with the same material as a material constituting the first liquid crystalline polymer film, is formed as a mixture of at least two or more types of photocurable monomer materials, is formed with a mixture of a single photocurable monomer material and liquid crystal, or is formed with a mixture of at least two or more types of photocurable monomer materials and liquid crystal.

5. The liquid crystalline polymer film according to claim 1, wherein a direction of the groove structure of the first liquid crystalline polymer film is coincident with an alignment direction of the alignment film.

6. The liquid crystalline polymer film according to claim 5,
    wherein the alignment film is patterned to be aligned,
    wherein the groove structure of the first liquid crystalline polymer film is patterned to be formed corresponding to the patterning of the alignment film, and wherein the direction of the patterned groove structure is coincident with the alignment direction of the patterned alignment film.

7. A liquid crystalline polymer film where diffraction optical noise is removed, comprising:
   a lens structure which is configured with a transparent material and has a reverse lens shape;
   a first liquid crystalline polymer film which is formed inside the lens structure and has a groove structure on an upper surface thereof, the first liquid crystalline polymer film being aligned by the groove structure; and
   a second liquid crystalline polymer film which is formed on the upper surface of the first liquid crystalline polymer film, the second liquid crystalline polymer film being aligned by the groove structure of the first liquid crystalline polymer film,
   wherein refractive indexes of the first liquid crystalline polymer film and the second liquid crystalline polymer film are matched with each other,
   wherein the second liquid crystalline polymer film is formed by aligning a second photocurable monomer material and, after that, performing photocuring, and
   wherein the second photocurable monomer material constituting the second liquid crystalline polymer film is formed with the same material as a material constituting the first liquid crystalline polymer film, is formed as a mixture of at least two or more types of photocurable monomer materials, is formed with a mixture of a single photocurable monomer material and liquid crystal, or is formed with a mixture of at least two or more types of photocurable monomer materials and liquid crystal.

8. The liquid crystalline polymer film according to claim 7,
   wherein the liquid crystalline polymer film further includes an alignment film on a surface inside the lens structure, and
   wherein an alignment direction of the alignment film is coincident with a direction of the groove structure of the first liquid crystalline polymer film.

9. The liquid crystalline polymer film according to claim 7, wherein the first liquid crystalline polymer film is formed by aligning a first photocurable monomer material and, after that, by performing photocuring.

10. The liquid crystalline polymer film according to claim 7, wherein the refractive index includes both of an ordinary refractive index and an extraordinary refractive index.

11. A method of manufacturing a liquid crystalline polymer film where diffraction optical noise is removed, comprising:
   a step (a) of forming a transparent lens structure having a reverse lens shape;
   a step (b) of forming a first liquid crystalline polymer film by coating an inner portion of the lens structure with a first photocurable monomer material, forming a groove structure on an upper surface thereof, and after that, performing photocuring at a predetermined first temperature; and
   a step (c) of forming a second liquid crystalline polymer film of which refractive index is matched with a refractive index of the first liquid crystalline polymer film by coating an upper portion of the first liquid crystalline polymer film with a second photocurable monomer material and performing photocuring at a predetermined second temperature,
   wherein the second photocurable monomer material is configured with the same material as a material for the first liquid crystalline polymer film, is configured with a mixture of at least two or more types of photocurable monomers, or is configured with a mixture of a single or different types of photocurable monomers and liquid crystal.

12. The method according to claim 11, further comprising a step of forming an alignment film on an inner surface of the lens structure after the step (a).

13. The method according to claim 11, wherein the first temperature and the second temperature are determined as temperatures satisfying refractive index matching conditions of the first liquid crystalline polymer film and the second liquid crystalline polymer film.

14. The method according to claim 11, wherein the refractive index includes an ordinary refractive index and an extraordinary refractive index.

* * * * *